Nov. 17, 1964  V. H. SHERVEN  3,157,435
SAFETY PROP FOR DUMP TRUCKS AND THE LIKE
Filed Aug. 1, 1963  2 Sheets-Sheet 1
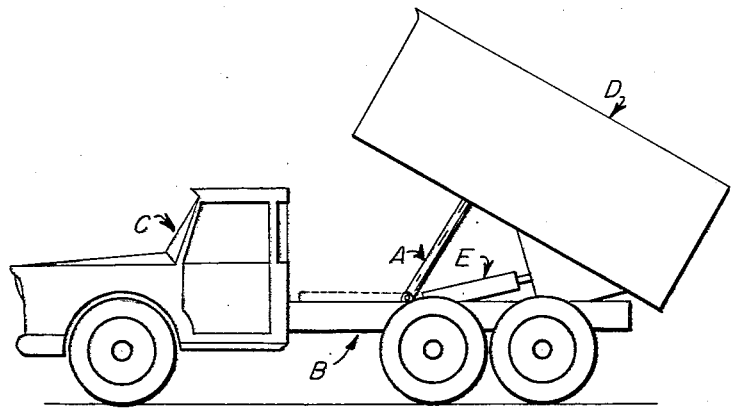
FIG. 1
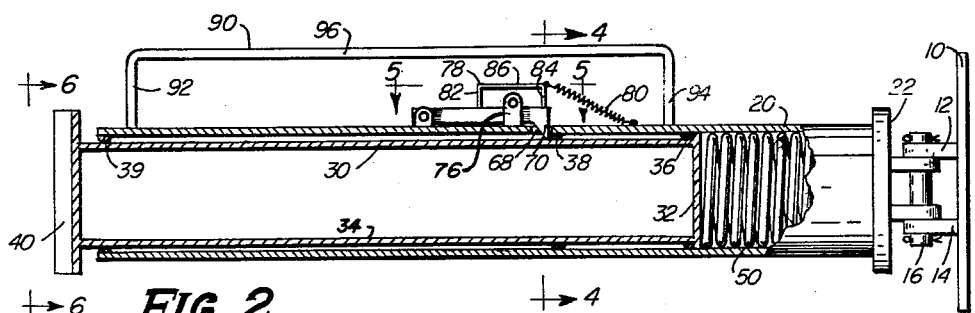
FIG. 2
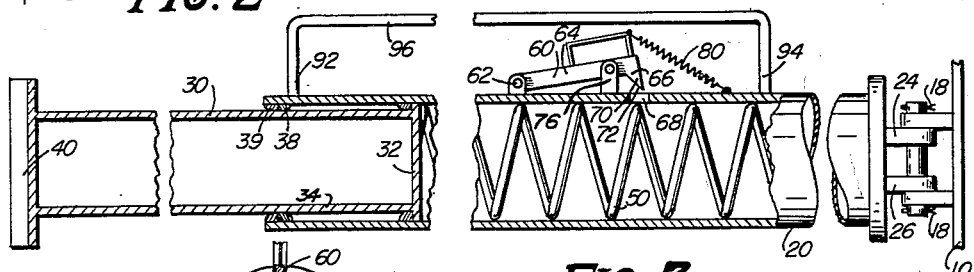
FIG. 3
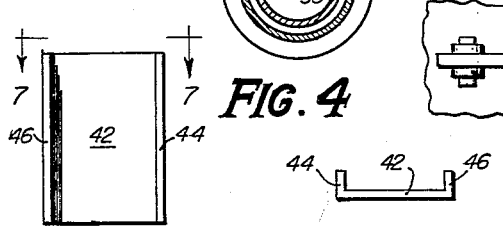
FIG. 4
FIG. 6
FIG. 7
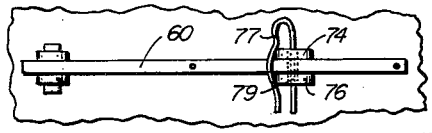
FIG. 5
INVENTOR.
VERN H. SHERVEN
BY
William F. Woods
ATTORNEY United States Patent Office 3,157,435
Patented Nov. 17, 1964

3,157,435
SAFETY PROP FOR DUMP TRUCKS
AND THE LIKE
Vern H. Sherven, Charlson, N. Dak.
Filed Aug. 1, 1963, Ser. No. 299,310
8 Claims. (Cl. 298—17)

This invention relates in general to a safety device for use on dump trucks, trailers, and similar vehicles; in particular, it concerns supporting apparatus designed to prop up a truck box in such a manner as to make it safe to work around and avoid accidents that may occur when the hydraulic lifting mechanism fails or breaks down.

The general object of the invention is to provide an improved safety prop for dump trucks and the like. Other objects of the invention are: to provide a safety prop that relies upon the truck box hoisting apparatus to reset the spring mechanism after the device is put into use; to provide apparatus of this type that can be easily manipulated by one man; to provide a safety prop for truck dump bodies that may be folded into an out of the way position upon the truck frame when it is not being used; to provide a safety prop for dump trucks and the like that is highly versatile and dependable in operation, simple and inexpensive to construct, and rugged and long wearing in service; to provide unique means for releasably locking the device in a selected position; to provide a safety prop for dump trucks and the like having novel means for engaging and securely propping up a dump body without the necessity of using additional blocking and special tools; and to provide a device of the character described having structural features designed to afford maximum safety and reliability without interruption of the normal operating characteristics of the vehicle to which it is attached.

These and other objects and advantages of the invention will become more fully apparent from a consideration of the following detailed description and accompanying drawings wherein a preferred embodiment of the invention is shown by way of illustration and not by way of limitation.

In the drawings:

FIGURE 1 is a side elevation illustrating the invention installed on a dump truck, the solid lines showing the invention in a position of rest upon the truck frame;

FIGURE 2 is a side view, partially in section, of the invention showing the dump body engaging member in a retracted position within the supporting member;

FIGURE 3 is a view similar to FIGURE 2, with parts removed for purpose of clarity, showing the dump body engaging member in an extended dump body engaging position;

FIGURE 4 is a view, partially in section, taken on the line 4—4 of FIGURE 3;

FIGURE 5 is an enlarged fragmentary view taken on the line 5—5 of FIGURE 3;

FIGURE 6 is a view taken on the line 6—6 of FIGURE 3;

FIGURE 7 is a view taken on the line 7—7 of FIGURE 6;

Figure 8:
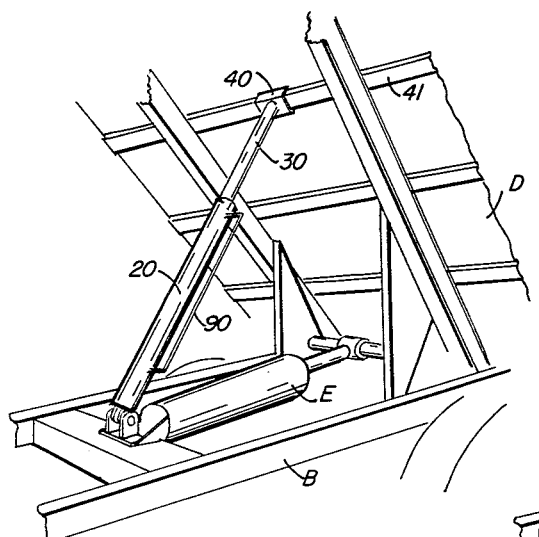
FIGURE 8 is a fragmentary perspective view showing the invention as it is used on a truck dump body with the dump body engaging member thereof illustrated in an extended dump body engaging position.

Generally speaking, according to the principles of my invention, I provide a pivotal telescoping safety prop that may be used on truck dump bodies to hold the same in an elevated position thus avoiding reliance upon the hydraulic hoisting mechanism when working on the truck frame in the area of the dump body. The device is provided with internal spring means which fires an inner telescoping member into supporting contact with a structural member of the dump body when the body is in a raised position. By letting the body down upon the inner telescoping member the spring means is retracted and cocked ready for another release. The truck body is then allowed to rest in a raised position upon the cocked safety prop. When it is desired to lower the body, the body is raised by its hoisting mechanism until the safety prop has enough room to be pivoted into a position of rest upon the truck frame.

Turning now to the drawings, the invention, indicated in its entirety by the reference character A, is illustrated in FIGURE 1 mounted in place upon the frame B of truck C. A dump body D, shown in a raised inclined position and equipped with hydraulic hoisting means E, is held up by means of safety prop A.

FIGURES 2 through 7 illustrate the structural features of safety prop A. A flat baseplate 10, which is adapted for mounting on one of the cross members of the truck frame B, is equipped with a pair of laterally spaced upstanding apertured lugs 12, 14 into which a hinge pin 16 is received and held in place by cotter pins 18. As shown in FIGURE 1 and FIGURES 8 through 11, the axis of hinge pin 16 is generally horizontal permitting safety prop A to rotate in a limited vertical plane with respect to frame B of truck C. Further included is a hollow generally elongated cylindrical supporting member or barrel 20 having a solid lower end plate 22 from which extend longitudinally therefrom a pair of spaced apertured lugs 24, 26 adapted to pivotally mount upon hinge pin 16 between lugs 12 and 14 of base plate 10.

Telescopically carried within supporting member 20 and extending longitudinally therefrom is a dump body engaging member or piston 30, which is of hollow cylindrical construction and of lesser radial extent than supporting member 20 whereby to allow for telescopic extension and retraction with respect thereto. The inner end 32 of dump body engaging member 30 is solid and of slightly greater radial extent than its body 34. A guide ring 36, which slidably engages the inner bore of supporting member 20, is secured to body 34 of member 30 adjacent inner end 32 thereof. A guide and stop ring 38 is also secured to member 30 between end 32 and its middle. A second guide ring 39 is secured to the inner bore of supporting member 20 adjacent its outer end. The outer end of member 30 is equipped with a jaw 40 that is adapted to engage one of the structural cross members 41 of the dump body D. As shown in FIGURES 6 and 7, jaw 40 is formed of channel stock having a base 42 and spaced flanges 44, 46 adapted to surround the cross member 41 of dump body D.

Further included is a compression spring member 50 that is mounted within supporting member 20 between end plate 22 thereof and the inner end 32 of member 30 whereby to normally bias member 30 into an extended position with respect to member 20.

Releasable latching means for holding member 30 in a retracted position within member 20 against the pressure of spring member 50 is provided by a hinged arm or lever 60 that is pivotally secured, as at 62, to the outside of member 20. Arm 60 has a rearwardly extending body 64 and a radially inwardly extending pawl member 66 that extends through an aperture 68 in body 20 whereby to permit the end 70 of pawl member 66 to abuttingly engage guide and stop ring 38 to prevent the extension of member 30 therebeyond. The forward surface of pawl member 66 is inclined, as at 72, to facilitate the rearward displacement of spring member 50 and rings 36, 38 therepast when member 30 is retracted within member 20. As shown in FIGURES 2 through 5, arm 60 is laterally guided by a pair of radially outwardly extending lugs 74, 76 which are positioned on either side thereof just behind the pawl member 66. A generally U-shaped removable spring clip 77 extends through an aperture 79 in lugs 74, 76 to lock arm 60 into engagement with member 30 when the device is cocked. A hand engageable latching handle 78 is secured to the outer surface of arm 66 and a coil spring 80 is provided to bias arm 60 normally toward members 20 and 30 so that pawl member 66 extends through aperture 68 whereby to engage stop and guide ring 38. Latching handle 78 is made up of a pair of outwardly radially extending legs 82, 84 and a longitudinally extending leg 86 that is radially spaced from the outer surface of arm 66. Overlying latching handle 78 and extending along substantially the length of member 20 is an outer support handle 90 consisting of a pair of outwardly radially extending legs 92, 94 and a longitudinally extending leg 96 that is radially spaced from leg 86 of latching handle 78. The radial distance between leg 96 and leg 86 is such that latching handle 78 can be conveniently squeezed by hand into an open position (as shown in FIGURE 3).

Figure 9:
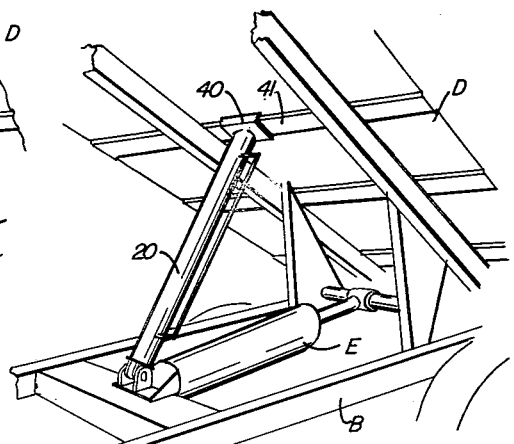
FIGURE 9 is a view similar to FIGURE 8 showing the dump body engaging member being retracted and cocked by the weight of the dump body.

Referring now to FIGURES 8 through 11 of the drawings wherein the latching means is omitted for purpose of clarity, the device is operated in the following manner: hoisting mechanism E is actuated to raise dump body D into the position shown in FIGURE 8; then support member 20 is tilted up and jaw 40 of member 30 is "aimed" at cross member 41. During this time member 30 is retracted within member 20. Latching handle 78 is pulled radially outward by the squeezing action referred to hereinabove resulting in the rotation of pawl member 66 out of engagement with guide and stop ring 38. Spring member 50 is released to extend member 30 and jaw 40 into engagement with cross member 41 of dump body D, as shown in FIGURE 8. Hoisting mechanism E is then actuated to allow dump body D to settle down on jaw 40 and push by its weight member 30 into a latched or "cocked" position within member 20, as shown in FIGURE 9. It will be understood that arm 60 and pawl member 66 are returned through aperture 68 into locking engagement with guide and stop ring 38 by means of coil spring 80 after hand pressure is released therefrom. In the FIGURE 9 position, the device functions as a static prop to hold up the dump body for repairs, for unloading and for keeping the dump body in a raised position independently of the hoisting mechanism. By avoiding complete reliance upon the hoisting mechanism, the safety of those who may be working on the truck frame or other parts adjacent to the dump body is effectively insured.

Figure 10:
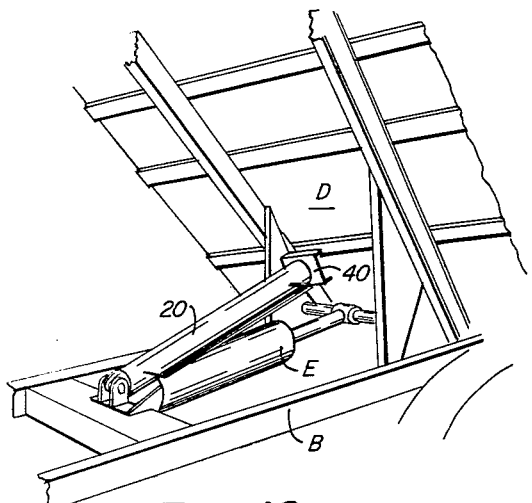
FIGURE 10 is a view similar to FIGURES 8 and 9 illustrating the position of the dump body engaging member after the dump body has been raised from contact therewith.
Figure 11:
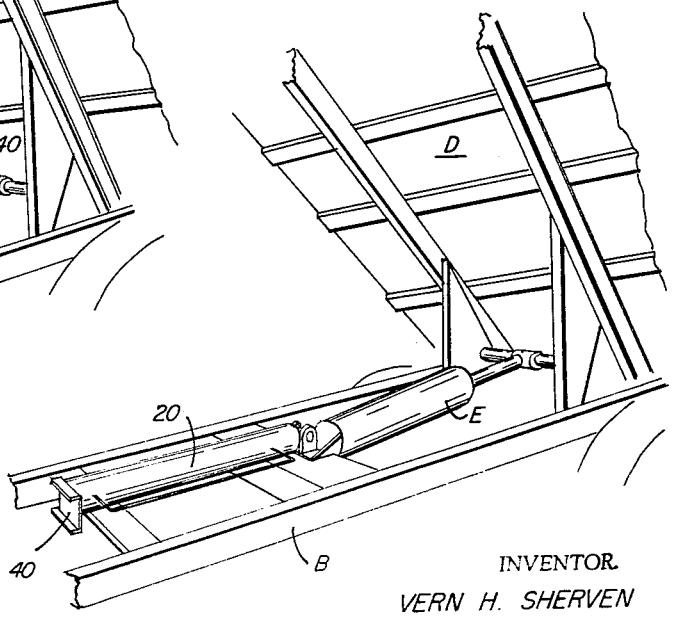
FIGURE 11 is a view similar to FIGURES 8–10 illustrating the invention in a position of rest upon the truck frame.

To release the device from its function as a safety prop, the hoisting mechanism E is actuated to raise the dump body D to free cross member 41 from jaw 40, as illustrated in FIGURE 10. Because member 30 has been previously retracted into a "cocked" position by the weight of dump body D, its length corresponds substantially to the length of member 20 and jaw 40 permitting it to fold rearwardly over hoisting mechanism E. For storage purposes when dump body D is lowered upon truck frame B, the device is folded forward about axis 16 into the position shown in FIGURE 11.

My invention has been thoroughly tested and found to be entirely satisfactory for the uses intended. It is believed that the invention, its mode of construction and assembly and operation, as well as its advantages should be readily understood from the foregoing without further description, and it should also be manifest that while a preferred embodiment of the invention has been shown and described for illustrative purposes, the structural details are nevertheless capable of wide variation within the purview of the invention as defined in the appended claims.

I claim:

1. In a safety prop for truck dump bodies, a hollow supporting member, a dump body engaging member telescopically carried within said supporting member, spring means within said supporting member for normally urging said dump body engaging member into an extended dump body engaging position, and latching means for releasably locking said dump body engaging member when it is retracted within said supporting member against the pressure of said spring means by the weight of the dump body.

2. The structure defined in claim 1 wherein a support handle is mounted exteriorly on said hollow supporting member, said handle being positioned with respect to said latching means whereby to permit the hand manipulation of said latching means by squeezing action between said support handle and said latching means.

3. The structure defined in claim 1 wherein said dump body engaging member is equipped with a jaw engageable with a structural member on the said dump body.

4. The structure defined in claim 1 wherein means are provided for normally biasing said latching means into locking engagement with said dump body engaging member.

5. The structure defined in claim 4 wherein means are provided for positively securing said latching means into locking engagement with said dump body engaging member.

6. In a safety prop for truck dump bodies, a barrel pivotally mounted on a truck frame for swinging movements in a generally vertical plane from a position of rest upwardly to a dump body engaging working position, a piston slidably positioned within and extending outwardly from said barrel, a dump body engaging jaw carried by the outer end of said piston, means including stop means within said barrel for biasing said piston and said jaw into an extended dump body engaging position, and means cooperable with the said stop means for releasably locking said piston in a retracted position within said barrel when said piston is pushed into said barrel by the weight of the truck body.

7. The device of claim 6 wherein said stop means consists of a circular ring secured to said piston.

8. The device of claim 7 wherein said barrel has an aperture therein and wherein said releasable locking means includes a pivotal lever having a pawl member normally biased through the aperture in said barrel into engagement with said stop means.

References Cited in the file of this patent

UNITED STATES PATENTS 2,082,139    Bassetti _____ June 1, 1937

FOREIGN PATENTS 604,727    Canada _____ May 1, 1962